United States Patent [19]

Iizuka

[11] Patent Number: 5,767,910
[45] Date of Patent: Jun. 16, 1998

[54] VIDEO SIGNAL COMPRESSING/ENCODING SYSTEM

[75] Inventor: Akira Iizuka, Tokyo, Japan

[73] Assignee: Nippon Steel Corporation, Tokyo, Japan

[21] Appl. No.: 729,674

[22] Filed: Oct. 3, 1996

[30] Foreign Application Priority Data

Oct. 11, 1995 [JP] Japan .................................. 7-289253

[51] Int. Cl.⁶ .................................................. H04N 7/30
[52] U.S. Cl. ................................... 348/403; 382/250
[58] Field of Search ........................... 348/384, 390, 348/395, 400–403, 405, 407, 409–412, 420, 699; 382/232, 236, 238, 248, 250; H04N 7/133

[56] References Cited

U.S. PATENT DOCUMENTS

| | | | |
|---|---|---|---|
| 5,091,782 | 2/1992 | Krause et al. | 348/402 |
| 5,168,357 | 12/1992 | Kutka | 348/403 |
| 5,216,712 | 6/1993 | Shimoda et al. | 348/405 |
| 5,412,428 | 5/1995 | Tahara | 348/395 |
| 5,453,799 | 9/1995 | Yang et al. | 348/699 |
| 5,481,309 | 1/1996 | Juri et al. | 348/405 |
| 5,570,199 | 10/1996 | Tanaka et al. | 348/407 |

OTHER PUBLICATIONS

Point–Illustration, Newest MPEG Textbook, K.K. Ascii, 1994, pp. 19, 137–155, and 277 (No Translation).

*Primary Examiner*—Richard Lee
*Attorney, Agent, or Firm*—Pollock, Vande Sande & Priddy

[57] ABSTRACT

A video signal compressing/encoding system includes a first memory for storing an input video signal including a series of pixel signals; a converting unit connected to the first memory for receiving a plurality of the pixel signals from the first memory and producing outputs by applying the read out pixel signals to a discrete cosine transforming process; an encoding unit connected to the converting unit for compressing and encoding the outputs of the converting unit; and second and third memories provided between the converting unit and the encoding unit for storing the outputs of the converting unit; wherein a series of the pixel signals stored in the first memory are divided into a plurality of macroblocks, each macroblock including a predetermined number of the pixel signals, the pixel signals included in each macroblock are read out both in an order of a first mode and in another order of a second mode, the outputs of the converting unit derived from the pixel signals read out in the order of the first mode are stored in the second memory, the outputs of the converting unit derived from the pixel signals read out in the order of the second mode are stored in the third memory, one of the second and third memories is selected, the outputs of the converting unit stored in the selected memory are read out, and the read out outputs of the converting unit are applied to the encoding unit.

9 Claims, 4 Drawing Sheets

FIG. 4
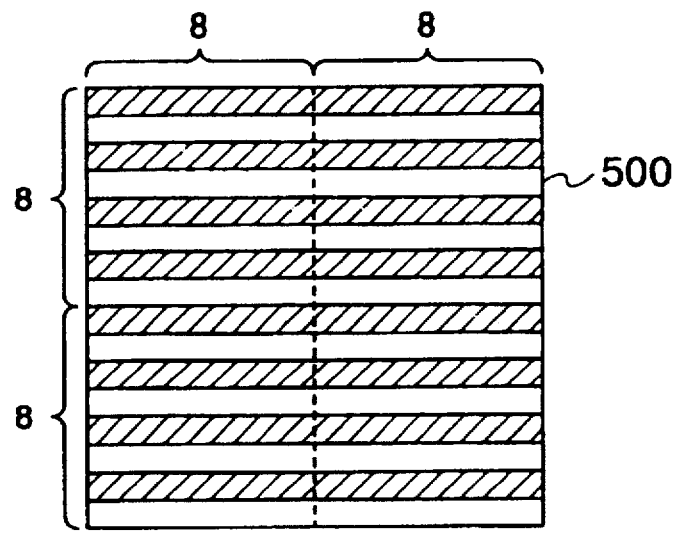
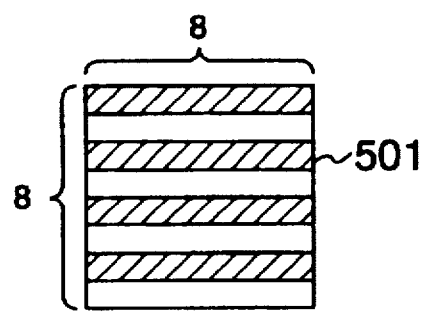
FIG. 5a
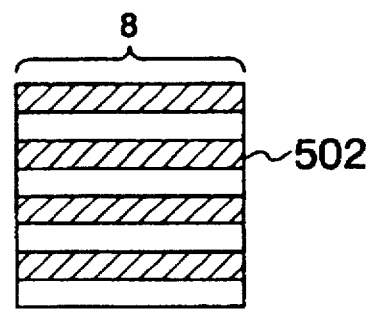
FIG. 5b
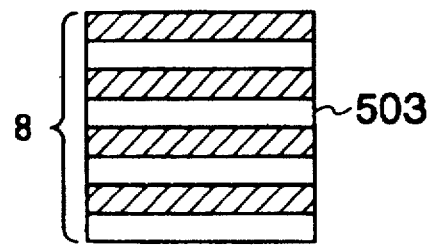
FIG. 5c
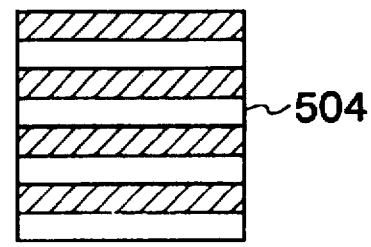
FIG. 5d

VIDEO SIGNAL COMPRESSING/ENCODING SYSTEM

BACKGROUND OF THE INVENTION

1. Field of the Invention

The present invention relates to a video signal compressing/encoding system and more particularly, to a system for compressing and encoding a digital video signal on a hybrid coding basis.

2. Description of the Related Art

Image coding techniques have been applied to various fields, for example, for transmitting a plurality of motion pictures through a single channel or storing a large amount of image data in a small capacity of memory medium by efficiently compressing an image signal with use of an image coding system.

Particularly, since international standards have been recently set for the image coding technique by an international organization such as ISO/IEC JTC/SC29/WG11 (generally called as MPEG) so as to secure its interchangeability among various systems or application fields of arts, the image coding technique has a tendency to be more widely used in various applications.

The recently leading compressing and coding technique, which is adopted as an international standard by the MPEG Recommendation, is a hybrid coding technique including the space-frequency transform encoding combined with another compressing/encoding technique such as encoding by motion compression and frame-based (or field-based) predicting or variable length encoding.

The details of the hybrid coding technique are described in "Point-Illustration, Newest MPEG Textboox" published on 1994, by K. K. Ascii, p.p. 19 and 137 to 155.

In the case where the above-mentioned hybrid coding technique is used, a plurality of predictions are carried out parallely in a predicting encoding section, in order to attain a highly efficient compression, so as to obtain respective predicting error signals, each of which is then subjected to space-frequency transform encoding. Thereafter, one of the outputs thereof which is most efficiently compressible is selected and subjected to quantizing and encoding operations. Incidentally, the discrete cosine transform (DCT) circuit, which is well known in the art of compressing and coding technique, is used for the space-frequency transform encoding.

In the standard prescribed in ISO/IEC13818-2, as referred hereinafter to "MPEG 2 Standard", for example, an image is divided into a plurality of areas, each area having a predetermined size and being called as "macroblock". An image part of each macroblock is represented by two kinds of image signal structures of a macroblock of frame structure and a macroblock of field structure and the respective image signal structures are subjected to discrete cosine transformation and one of the outputs thereof, which is most efficiently compressible, is selected.

Incidentally, various proposals have been made for realizing the video signal compressing and encoding according to the MPEG2 standard. The MPEG2 standard can be performed by providing independently a DCT circuit exclusively used for the macroblock of frame structure and another DCT circuit exclusively used of the macroblock of field structure and applying the subsequent encoding process to a selected one of the outputs of the respective DCT circuits to which the compressing and encoding can be more efficiently applied. However, this arrangement requires two DCT circuits and it is impossible to make simple the construction of the system.

Further, when processing the macroblock of frame structure or the macroblock of field structure by the DCT circuit, the DCT circuit produces a series of outputs in a predetermined order generally called as an order of zig-zag scan. However, when applying the outputs of the DCT circuit to the subsequent encoding circuit, it is sometimes desired, in view of the efficiency in operation of the encoding circuit, to change the order of the outputs as applied to the encoding circuit. Therefore, according to the MPEG2 recommendation, it is suggested to make possible to apply the outputs of the DCT circuit in an order of alternate scan to the subsequent encoding circuit.

SUMMARY OF THE INVENTION

It is therefore an object of the present invention to provide a video signal compressing/encoding system using a single DCT circuit and capable of performing hybrid compressing/encoding including space frequency transform coding.

A second object of the present invention is to provide a video signal compressing/encoding system which can apply the outputs of a DCT circuit in an arbitrary order to a subsequent encoding circuit.

According to the present invention, a video signal compressing/encoding system comprises: first memory means for storing an input video signal including a series of pixel signals; converting means connected to the first memory means for receiving a plurality of the pixel signals read out of the first memory means, and producing outputs by applying the read out pixel signals to a discrete cosine transforming process; encoding means connected to the converting means for compressing and encoding the outputs of the converting means; second and third memory means provided between the converting means and the encoding means for storing the outputs of the converting means; first control means for controlling reading out of the pixel signals from the first memory means and storing the outputs of the converting means into the second and third memory means in a manner such that a series of the pixel signals stored in the first memory means are divided into a plurality of macroblocks, each macroblock including a predetermined number of the pixel signals, the pixel signals included in each macroblock are read out both in an order of a first mode and in another order of a second mode, the outputs of the converting means derived from the pixel signals read out in the order of the first mode are stored in the second memory means and the outputs of the converting means derived from the pixel signals read out in the order of the second mode are stored in the third memory means; and second control means for selecting any one of the second and third a memory means, reading out the outputs of the converting means stored in the selected memory means and applying the read out outputs of the converting means to the encoding means.

In a preferred embodiment of the invention, the second control means includes means for reading out the outputs of the converting means stored in the selected memory means in an order different from an order in which the outputs of the converting means are written in the selected memory means.

BRIEF DESCRIPTION OF THE DRAWINGS

FIGS. 4 to 6 are diagrams for explaining a macroblock of frame structure and a macroblock of field structure in arrangement of pixel signals.

DESCRIPTION OF THE PREFERRED EMBODIMENTS

An embodiment of a video signal compressing/encoding system in accordance with an embodiment of the present invention will be explained in detail with reference to the accompanying drawings.

Figure 1:
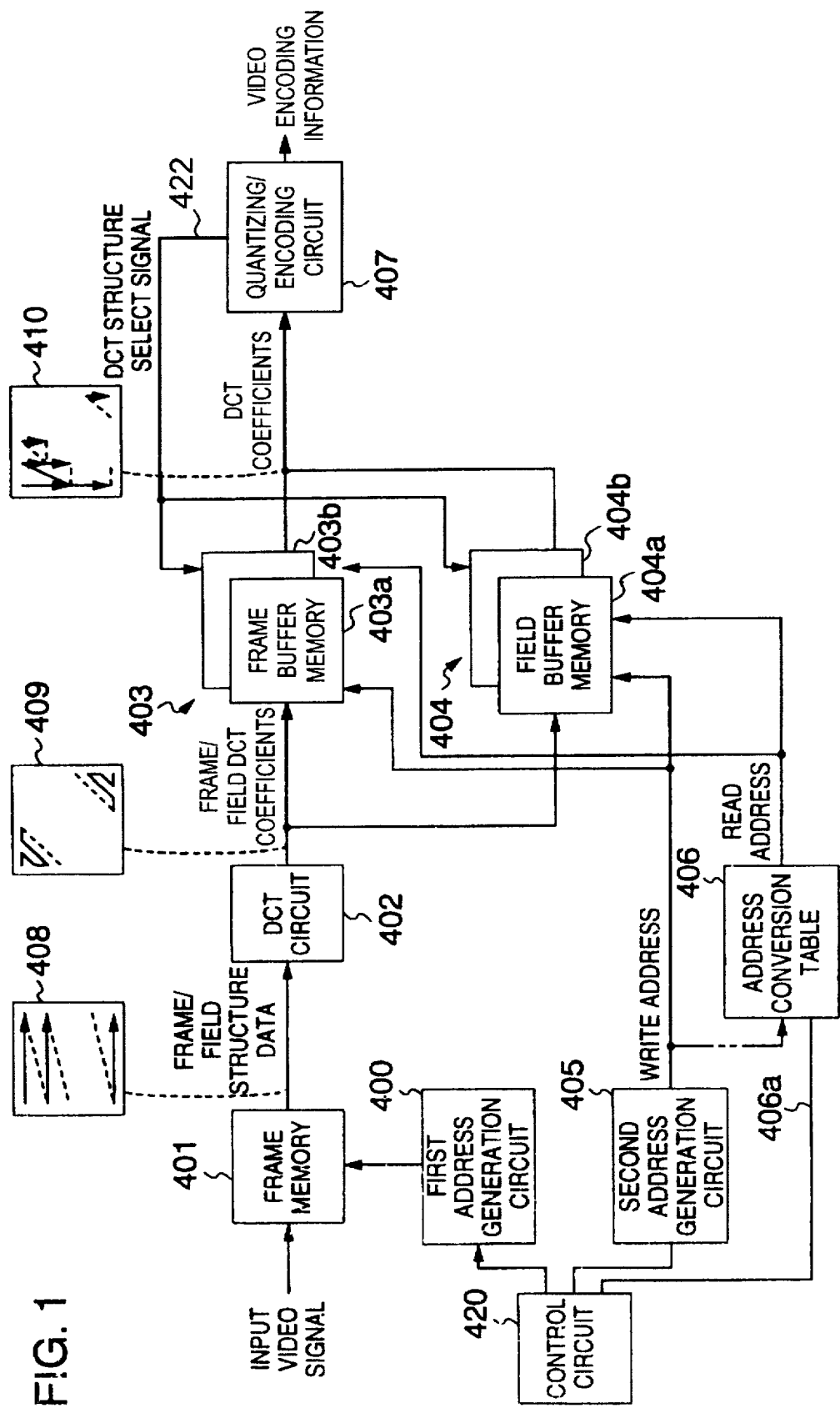
FIG. 1 is a block diagram of an arrangement of a video signal compressing/encoding system in accordance with a first embodiment of the present invention.
Figure 2:
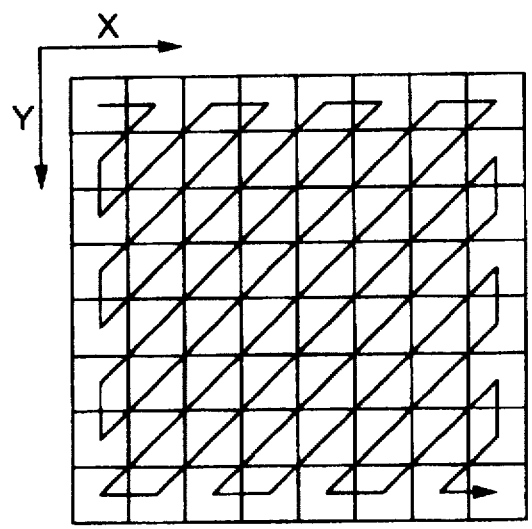
FIG. 2 is a diagram showing the sequence of zigzag scan.
Figure 3:
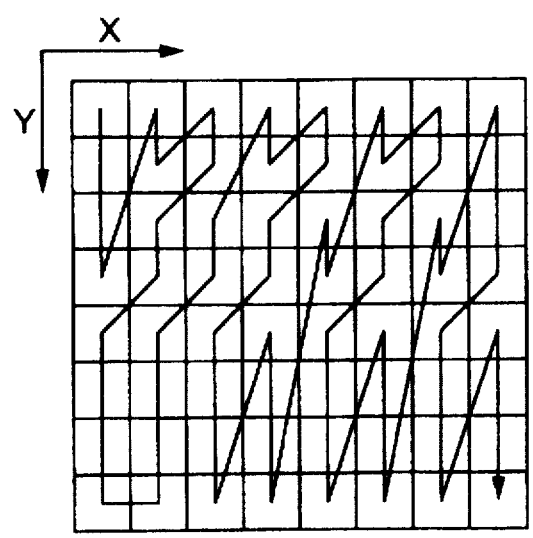
FIG. 3 is a diagram showing the sequence of alternate scan.
Figure 6A:
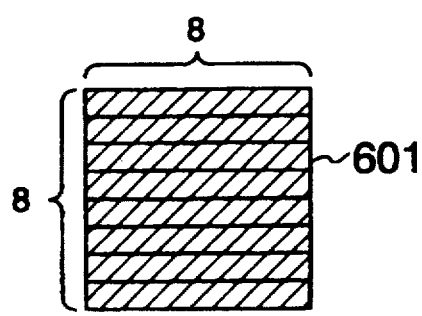
Figure 6B:
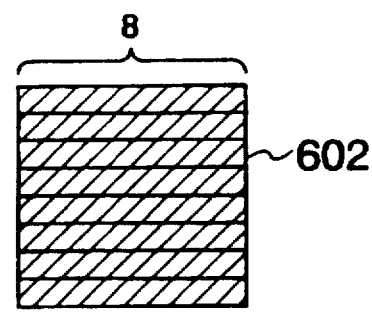
Figure 6C:
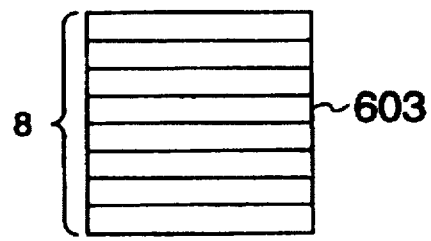
Figure 6D:
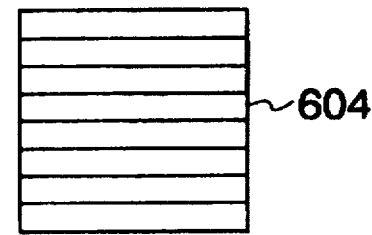

As shown in FIG. 1, the video signal compressing/encoding system of the present embodiment includes a first address generation circuit 400, a frame memory 401, a discrete cosine transform (DCT) circuit 402, a frame buffer memory 403, a field buffer memory 404, a second address generation circuit 405, an address conversion table 406, a quantizing/encoding circuit 407 and a control circuit 420.

The frame memory 401 is provided as a digital video signal memory means, and the DCT circuit 402 is provided as a discrete cosine transform means. Further, the first address generation circuit 400 is provided as a video signal address generation means for generating an address for writing/reading an input video signal in/from the frame memory 401.

The second address generation circuit 405 is provided as an image data address generation means for generating an address for writing/reading frame and field DCT data outputted from the DCT circuit 402 in/from each of the frame and field buffer memories 403 and 404. The control circuit 420 is used to control the modes as will be described later, in which the first and second address generation circuits generate respective address signals.

A video signal is usually obtained by interlace scanning of a motion picture image, and a frame image is made up of a field image obtained through scanning of odd-numbered lines and a field image obtained through scanning of even-numbered lines.

For example, when one frame in the video signal is made up of pixels of horizontal 352 lines×vertical 288 columns, the frame memory 401 has individually addressable memory areas at least corresponding to the 352×288 pixels, respectively, so that at least one frame of the input video signal can be stored. The 352×288 pixels corresponding to one frame are divided into a plurality of macroblocks as mentioned above, each macroblock including, e.g., 16×16 pixels. Pixel signals of every one macroblock are read out from the frame memory 401 and processed. In this case, a group of 16×16 pixel signals contained in every one macroblock are read out in orders of two modes, that is, in an order of a first mode corresponding to the macroblock of frame structure and an order of a second mode corresponding to the macroblock of field structure; and then the readout pixel signals of one macroblock are applied to the DCT circuit 402 and subjected to a discrete cosine transformation.

In this connection, before applying the group of pixel signals of the macroblock of frame structure (or the macroblock of field-structure) read out from the frame memory 401 to the DCT circuit, the pixel signals may be processed for encoding by motion compensation and frame-based (or field-based) prediction.

The specific reading orders of the first and second modes are determined as follows according to the MPEG2 standards. As shown in FIG. 4, one macroblock 500 includes 8 odd-numbered lines (hatched lines) and 8 even-numbered lines (non-hatched lines), each line including 16 pixels. In the case of interlace-scanning, the odd-numbered lines are first and then the even-numbered lines are scanned.

In the first mode reading, as shown in FIG. 5, the macroblock 500 is divided into 4 sub-blocks a, b, c and d and the 4 sub-blocks are read out in the order of a, b, c and d while the pixel signals in each sub-block are read out in an order of raster scan (in the order of the upper to the lower line and left to right in each line). Each sub-block includes 8×8 pixels and the sub-blocks a, b, c and d correspond to the quaters in upper left, upper right, lower left and lower right of one macroblock 500 respectively.

In the second mode reading, when the macroblock 500 is divided into 4 sub-blocks a, b, c and d as shown in FIG. 6, the order in reading of the 4 sub-blocks and the order in reading of pixel signals in each sub-block are the same as those in the first mode reading, except that, in the second mode, the sub-blocks a, b, c and d correspond to only odd-numbered lines in the left half of one macroblock 500, only odd-numbered lines in the right half of one macroblock 500, only even-numbered lines in the left half of one macroblock 500, and only even-numbered lines in the right half of one macroblock 500, respectively.

A group of pixel signals of one macroblock read out in the first mode from the frame memory 401 are processed at the DCT circuit 402 for the discrete cosine transformation, and the outputs of the DCT circuit 402 are stored in the frame buffer memory 403. A group of pixel signals of one macroblock read out in the second mode from the frame memory 401, on the other hand, are 25 processed at the DCT circuit 402 for the discrete cosine transformation, and the outputs of the DCT circuit 402 are stored in the field buffer memory 404.

In other words, the frame buffer memory 403 and the field buffer memory 404 temporarily store the output data of the DCT circuit 402 obtained by processing the group of pixel signals of the macroblock of frame structure and the group of pixel signals of the macroblock of field structure respectively. Each of the frame buffer memory 403 and the field buffer memory 404 has a double buffer structure, that is, 2 memory banks 403a and 403b or 2 memory banks 404a and 404b, each memory bank having at least 16×16 memory areas, so that while writing new data in one memory bank, the previously-written data is read out from the other memory bank.

As mentioned above, the pixel signals of the macroblock of frame structure are read out in the first mode from the frame memory 401, while the pixel signals of the macroblock of field structure are read out in the second mode from the frame memory 401. In either case, however, the pixel signals of each sub-block are read out in an order of raster scan 408 and applied to the DCT circuit 402. The DCT circuit 402 processes each received sub-block and produces outputs called as DCT coefficients representing the respective energies of frequency components of each sub-block in an order of zig-zag scan.

The DCT circuit 402 produces frame DCT coefficients by processing the macroblock of frame structure and the frame DCT coefficients are, in turn, written in one of the memory banks 403a and 403b of the frame buffer memory 403 set to the write mode. On the other hand, the DCT circuit 402 produces field DCT coefficients by processing the macroblock of field structure, and the field DCT coefficients are, in turn, written in one of the memory banks 404a and 404b of the field buffer memory 404 set to the write mode.

One of the memory banks of the buffer memory 403 or 404 in which the frame or field DCT coefficients are to be written and the write addresses thereof are designated by a write enable signal and write address signals generated by the second address generation circuit 405 under control of the control circuit 420.

At this time, since the DCT coefficients outputted from the DCT circuit are generated in the order of zigzag scan 409 in each sub-block, the outputs are written in an order of zigzag scan by incrementing by 1 the write address signal generated by the second address generation circuit in synchronism with the generation of each DCT coefficient.

Applied to read-side one of the memory banks of the buffer memory 403 or 404 is a read enable signal (preferably, a logical inversion of the write enable signal) generated by the second address generation circuit 405 under control of the control circuit 420. During the application of the write enable signal to one of the memory banks of each buffer memory, the read enable signal is applied to the other memory bank thereof. The write and read enable signals applied to the respective buffer memories are inverted each time the pixel signals of one macroblock are read out in the first and second modes from the frame memory 401 and processed by the DCT circuit.

The quantizing/encoding circuit 407 judges which of the frame and field DCT coefficients stored in the frame and field buffer memories 403 and 404 can be processed more efficiently, generates a DCT select signal 422 indicative of the buffer memory in which the DCT coefficients judged as more efficient are stored, and applies the DCT select signal to the buffer memories 403 and 404.

As a result, the DCT select signal causes the DCT coefficients stored in one of the memory banks, to which the read-enable signal is applied, of the buffer memory judged as more efficient to be read out therefrom and then applied to the quantizing/encoding circuit 407. This is realized by making non-active the read enable signal applied to the non-elected buffer memory.

When the address supplied from the second address generation circuit 405 is used directly as the memory bank read address, the order in reading is the same as the order in writing, so that the reading is carried out in the order of zigzag scan.

When the order other than the order of zigzag scan is to be designated for reading, the read address is converted by the address conversion table 406 and then the converted address is supplied to the read-side one of the memory banks of the buffer memory 403 or 404.

When a signal indicative of selection of another scanning system is applied from the control circuit 420 to a scan system select terminal 406a to instruct, e.g., an order of the alternate scan, the address conversion table 406 converts the addresses, which are produced by the second address generated circuit 405 and provide effectively the order of zigzag scan, into addresses for an order of alternate scan and outputs the converted addresses.

The DCT coefficients thus selected are applied to the quantizing/encoding circuit 407 in the order of alternate scan as shown by an arrow 410 in FIG. 1 and processed for quantizing and encoding operations to thereby generate video encoded information.

Although the above explanation has been made by way of example of a case where the scan order is converted to the order of alternate scan, it is possible to employ any scan system by rewriting the address conversion table 406.

In accordance with the present invention, the pixel signals of one macroblock are read out both in the order of a first mode corresponding to the macroblock of frame structure and in the order of a second mode corresponding to the macroblock of field structure and respectively processed by the DCT circuit. The resultant outputs of the DCT circuit are stored separately in the first and second memory means and the outputs of the DCT circuit as stored in one of the memory means are selected and applied to the subsequent encoding means by considering the efficiency in processing by the encoding means. Therefore, since it is enough to provide only one DCT circuit having a complicated construction, a video signal compressing/encoding system adapted to perform encoding the hybrid coding system can be made simple in arrangement.

Further, in a preferred embodiment, it is possible, by controlling the order in which the outputs of the DCT circuit are read out from a selected one of the first and second memory means, to read out the outputs of the DCT circuit in an order different from the order in which the outputs of the DCT circuit are stored therein. Therefore, the processing by the alternate scan according to the MPEG2 recommendation can be readily realized.

I claim:

1. A video signal compressing/encoding system comprising:

first memory means for storing an input video signal including a series of pixel signals;

converting means connected to the first memory means for receiving a plurality of the pixel signals read out of the first memory means, and producing outputs by applying the read out pixel signals to a discrete cosine transforming process;

second and third memory means provided between the converting means and an encoding means for storing the outputs of the converting means; the encoding means further compressing and encoding the outputs of the second and third memory means, respectively;

first control means for controlling reading out of the pixel signals from the first memory means and storing the outputs of the converting means into the second and third memory means in a manner such that a series of the pixel signals stored in the first memory means are divided into a plurality of macroblocks, each macroblock including a predetermined number of the pixel signals, the pixel signals included in each macroblock are read out both in an order of a first mode and in another order of a second mode, the outputs of the converting means derived from the pixel signals read out in the order of the first mode are stored in the second memory means and the outputs of the converting means derived from the pixel signals read out in the order of the second mode are stored in the third memory means; and second control means for selecting any one of the second and third memory means, reading out the outputs of the converting means stored in the selected memory means and applying the read out outputs of the converting means to the encoding means.

2. A video signal compressing/encoding system as set forth in claim 1, wherein said first control means includes a first circuit for generating address signals designating addresses to be read out of said first memory means, a second circuit for generating a write enable signal enabling selectively writing in any one of said second and third memory means, and a control circuit for controlling operations of said first and second circuits.

3. A video signal compressing/encoding system as set forth in claim 1, wherein said converting means includes a DCT circuit to perform discrete cosine transformation.

4. A video signal compressing/encoding system as set forth in claim 1, wherein said encoding means performs encoding according to the MPEG standard.

5. A video signal compressing/encoding system comprising:

first memory means for storing an input video signal including a series of pixel signals;

converting means connected to the first memory means for receiving a plurality of the pixel signals read out of the first memory means, and producing outputs by applying the read out pixel signals to a discrete cosine transforming process;

second and third memory means provided between the converting means and an encoding means for storing the outputs of the converting means; the encoding means further compressing and encoding the outputs of the second and third memory means, respectively;

first control means for controlling reading out of the pixel signals from the first memory means and storing the outputs of the converting means into the second and third memory means in a manner such that a series of the pixel signals stored in the first memory means are divided into a plurality of macroblocks, each macroblock including a predetermined number of the pixel signals, the pixel signals included in each macroblock are read out both in an order of a first mode and in another order of a second mode, the outputs of the converting means derived from the pixel signals read out in the order of the first mode are stored in the second memory means and the outputs of the converting means derived from the pixel signals read out in the order of the second mode are stored in the third memory means; and second control means for selecting any one of the second and third memory means, reading out the outputs of the converting means stored in the selected memory means in a controlled order and applying the read out outputs of the converting means to the encoding means.

6. A video signal compressing/encoding system as set forth in claim 5, wherein said first control means includes a first address signal generation circuit for generating address signals designating addresses to be read out of said first memory means, and a second address signal generation circuit for generating address signals designating addresses to be read out of said second and third memory means.

7. A video signal compressing/encoding system as set forth in claim 6, wherein said second control means includes an address conversion circuit for converting the address signals generated by said second address signal generation circuit to address signals indicative of addresses to be read out of said second and third memory means.

8. A video signal compressing/encoding system as set forth in claim 5, wherein said converting means includes a DCT circuit to perform discrete cosine transformation.

9. A video signal compressing/encoding system as set forth in claim 5, wherein said encoding means performs encoding according to the MPEG standard.

* * * * *

UNITED STATES PATENT AND TRADEMARK OFFICE
CERTIFICATE OF CORRECTION

PATENT NO. : 5,767,910
DATED : June 16, 1998
INVENTOR(S) : Iizuka

It is certified that error appears in the above-identified patent and that said Letters Patent is hereby corrected as shown below:

```
Column 3, line 3, change "FIGS. 4 to 6" to
    --FIGS. 4, 5a-d and 6a-d--.
```

Signed and Sealed this

First Day of September, 1998

Attest:

BRUCE LEHMAN

Attesting Officer

Commissioner of Patents and Trademarks